Patented Apr. 4, 1939

2,153,511

UNITED STATES PATENT OFFICE 2,153,511

PREPARATION OF PALE COLORED ALKYD RESINS

Harold C. Cheetham, Philadelphia, Pa., and William L. Evers, Woodbury, N. J., assignors to The Resinous Products & Chemical Company, Philadelphia, Pa.

No Drawing. Application March 6, 1937, Serial No. 129,378

8 Claims. (Cl. 260—22)

This invention relates to a method of producing lighter colored synthetic resins of the fatty oil modified type, particularly those obtained by reacting a polybasic acid with a polyhydric alcohol and a fatty oil or a fatty oil acid.

In the preparation of fatty oil modified synthetic resins the heating necessary to produce the desired chemical reaction causes an undesirable darkening of the product unless carried out in the total absence of oxygen. In the manufacture of alkyd type resins when light colored products are desired for making white enamels or clear varnishes, it is customary to use the lightest colored and purest raw materials available; e. g., sublimed phthalic anhydride, distilled maleic anhydride, distilled glycerine, highly refined oils or distilled fatty acids, etc., and to exclude air as much as possible by maintaining an inert atmosphere such as carbon dioxide or nitrogen in contact with the reaction mixture. Temperatures are some times employed which tend to bleach certain drying oils, but more frequently the reaction is carried out at temperatures where the reaction mixture is distinctly susceptible to darkening. In spite of all precautions, various colored bodies are formed during the condensation, so that the products become darker the longer the reaction is carried on.

The object of this invention is to provide a way to avoid this darkening during processing and to obtain oil modified synthetic resins of lighter color. A further object is to provide a way to produce a bleaching of the oil during the manufacture of the resin.

It has been found in the manufacture of oil modified alkyd resins that if small amounts of oil-soluble organic esters of phosphorous acid are added to the reaction mixture early in the reaction, so that they are present in solution throughout the major course of the reaction, the usual darkening is substantially prevented, provided, of course, that customary precautions are taken to exclude air. Frequently, a distinct bleaching occurs and the resinous products are substantially lighter in color than similar resins made under the same conditions without the phosphorous esters.

In applying the invention no changes are needed in the present-day methods of making alkyd resins. In those methods which first partially or completely react the dibasic acid with the polyhydric alcohol and then add the fatty oil or fatty oil acids as also in those processes which mix the three reactants at or about the same time, the phosphorous esters may be added to either the oil, the polybasic acid, the polyhydric alcohol, the reaction product of polybasic acid and polyhydric alcohol, or the mixture. Preferably it should be incorporated in the mixture with or prior to the addition of the oil or oil acid. In those methods in which fatty oil is first heated with a polyhydric alcohol such as glycerine to produce mono- or diglycerides which are then reacted with polybasic acid with or without additional glycerine, the phosphorous esters are preferably added directly following the addition of the polybasic acid. To obtain the best results pale starting materials should be used and ordinary precautions to exclude air from the reaction mixture should be taken.

Any of the organic esters of phosphorous acid may be used for the purpose. Among those found suitable are the following:

1. Triarylphosphites (ArO)$_3$P, triphenyl phosphite, tricresyl phosphite, trioctylphenyl phosphite, trinaphthyl phosphite.
2. Triarylthiophosphites (ArS)$_3$P—triphenylthiophosphite.
3. Nitro derivatives of triarylphosphites—tri(nitrophenyl) phosphite.
4. Trialkyl phosphites (RO)$_3$P—trimethyl phosphite, triethyl phosphite, trioctyl phosphite, trilauryl phosphite.
5. Dialkyl phosphites (RO)$_2$POH—dimethyl and dibutyl phosphite.
6. Monoalkyl phosphites ROP(OH)$_2$—monobutyl phosphite.

The aromatic phosphites are readily prepared from phosphorus trichloride and phenols, the aliphatic from phosphorus trichloride and alcohol in the presence of pyridine and ether or from phosphorus trichloride and sodium alcoholate. In these reactions some compounds represented by the formulae (RO)$_2$PCl and (RO)PCl$_2$ are sometimes formed. While it is not necessary to use purified phosphites, it is desirable to hydrolyze these chlorides and thereby prevent the formation of hydrogen chloride in the reaction mixture. This is not necessary however, for these compounds are themselves effective in preserving light color.

The phosphorous esters of monohydroxy phenols and monohydric alcohols are preferred, particularly the esters of monohydric phenols, because of their ease of preparation but esters of polyhydric compounds such as those of glycol, glycerine, hydroquinone, etc., may also be used. The less volatile esters are also preferred because of their permanence in the reaction mixture.

Only very small quantities of these esters are needed to produce a substantially lighter resin. Amounts between 0.05 and 2% of the weight of the resin will usually produce the maximum effect. Larger quantities can be used but if excessive additions are made they act as plasticizers giving a softer resin and interfering with its drying and baking properties. Some alkyd resins, particularly those modified with non-drying oils are themselves used as plasticizers. The presence of excess phosphites in those resins is not as objectionable as in the drying and baking type, but since the plasticizing qualities of this class of alkyds are somewhat different from those of the so called "chemical plasticizers" as typified by tricresyl phosphate, it is not advisable to add more than is necessary to obtain the desired lightening in color.

The color improvement can be obtained in any of the so called "oil modified" alkyd resins. The dibasic acid or acids used may be aliphatic, such as succinic, maleic, fumaric, adipic, sebacic, etc., aromatic, such as phthalic, naphthalic, etc., or hydroaromatic, such as hydrophthalic. Mixtures of these acids may also be used. The polyhydric alcohol may be glycerol, glycol, polyglycerol, polyglycol, pentaerythrite, mannitol, sorbitol, perhydro dihydroxy-diphenyl propane, etc. Mixtures of these alcohols may also be used and in some cases modification with monohydric alcohols such as butanol may be desirable. The oils or fatty acids used may be of or derived from the drying type, such as linseed, China-wood oil, perilla, soy bean, fish oil, such as sardine oil, etc., or of the semi-drying type such as sunflower, hempseed, etc. or of the non-drying type, such as cottonseed, castor, beef-tallow, etc. Modifying ingredients, such as the oil soluble phenol-formaldehyde condensates, either unmodified or modified with rosin or ester gum, hydrocarbon soluble urea-formaldehyde condensates such as those prepared in anhydrous alcoholic solution, e. g. in butanol, ester gum, and other synthetic and natural resins may be added.

The various ways in which the polybasic acids, polyhydric alcohols, fatty oil, and modifying monohydric alcohol or resin may be combined are innumerable. This invention is, however, independent of the specific combination. It is applicable to the simplest condensation of polybasic acid, polyhydric alcohol and fatty oil and as equally effective in the most complex condensations such as those embodying an initial condensation between a natural resin, such as rosin, and maleic acid or a mono ester of maleic acid and a mono- or dihydric alcohol, followed by a condensation of the intermediate thus obtained with glycerine and fatty oil or fatty oil acids. In all these methods the adding of small amounts of phosphorous acid esters will lead to marked color improvement which is retained by the resin even when incorporated in an air drying or baking finish.

In many instances, particularly where care is taken to exclude air, the resins obtained by the process are distinctly lighter in color than the starting mixture. This result does not however, appear to be due to a chemical bleaching of the mixture by the phosphites but rather to a suppression of color formation which in the absence of the phosphites neutralizes the natural bleaching that some drying oils exhibit when heated. It is believed that the effectiveness of the phosphorous esters is due to their acting as reducing agents preventing the oxidation of bodies in the reaction mixture to form colored compounds. By avoiding the formation of these colored compounds the bleaching due to heat alone is no longer counteracted.

The following examples are given to illustrate the invention, with the understanding that it is not confined to the particular compositions and details of processing selected.

*Example 1.*—200 parts by weight of phthalic anhydride, 137 parts of dynamite glycerine, 277 parts of distilled linseed oil fatty acids, and 0.6 part of triphenyl phosphite are heated to 225–235° C. in a closed vessel, meanwhile passing a stream of $CO_2$ through the reaction mass to exclude air and assist in removing the volatile by-products of the reaction, which are vented from the vessel continuously, until the acid number of the resinous product drops below approximately 12. An exceedingly pale colored, alkyd resin results, soluble in petroleum spirits or aromatic hydrocarbons, which may be used as a rapid drying vehicle for various pigmented or clear coatings, that on the addition of drier will dry in air at ordinary temperatures in a few hours, or may be baked at slightly elevated temperatures for a shorter time, as is practiced in the art.

*Example 2.*—240 parts by weight of castor oil, 50 parts of dynamite glycerol, 100 parts of phthalic anhydride, and 2 parts of tricapryl phosphite are heated, as described in Example 1, to 250–260° C. for several hours until the acid number of the resulting resin drops below approximately 15. A pale colored resin, eminently suited for white enamels or clear varnishes, results.

*Example 3.*—200 parts by weight of phthalic anhydride, 120 parts of dynamite glycerine, 225 parts of castor oil, and 3 parts of trioctylphenyl phosphite are heated, as described in Example 1, to 210–220° C., for several hours, until the acid number of the resulting resin drops below 15. A very pale, non-drying alkyd results which is particularly suited as a plasticizer, for example, with nitrocellulose compositions, urea-formaldehyde lacquers, etc.

Modifications of the process herein described will be apparent to persons familiar with resin manufacture and varnish, paint and enamel making technique. It is intended that the patent shall cover all such modifications as include the beneficial results obtainable by the process.

We claim:

1. In the process of making pale colored fatty oil modified and fatty oil acid modified alkyd resins, the improvement which comprises adding to the resin forming reaction mixtures an oil soluble organic ester of phosphorous acid whereby the formation of colored bodies is retarded.

2. In the process of making pale colored fatty oil modified and fatty oil acid modified alkyd resins, the improvement which comprises adding to the resin forming reaction mixture an oil soluble ester of a monohydric phenol and phosphorous acid whereby the formation of colored bodies is retarded.

3. In the process of making pale colored alkyd resins modified with drying oil acids the improvement which comprises adding to the resin forming reaction mixture an oil soluble triaryl ester of phosphorous acid whereby the formation of colored bodies is retarded.

4. In the process of making pale colored alkyd resins modified with drying oil acids the improvement which comprises adding to the resin forming reaction mixture triphenyl phosphite whereby the formation of colored bodies is retarded.

5. A pale colored fatty oil or fatty oil acid modified alkyd resin made by carrying out the resin forming reaction in the presence of from 0.05 to 2% by weight of an oil soluble organic ester of phosphorous acid whereby the formation of colored bodies is retarded.

6. A pale colored fatty oil or fatty oil acid modified alkyd resin made by carrying out the resin forming reaction in the presence of from 0.05 to 2% by weight of an oil soluble ester of a monohydric phenol and phosphorous acid whereby the formation of colored bodies is retarded.

7. A pale colored fatty oil or fatty oil acid modified alkyd resin made by carrying out the resin forming reaction in the presence of from 0.05 to 2% by weight of triphenyl phosphite whereby the formation of colored bodies is retarded.

8. A pale colored drying oil acid modified alkyd resin made by carrying out the resin forming reaction in the presence of from 0.05 to 2% by weight of an oil soluble triaryl ester of phosphorous acid whereby the formation of colored bodies is retarded.

HAROLD C. CHEETHAM.
WILLIAM L. EVERS.